Feb. 4, 1941.           W. F. SKEATS           2,230,730
CIRCUIT BREAKER TESTING ARRANGEMENT
Filed Jan. 11, 1939
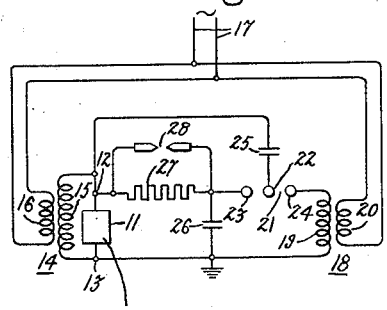
CIRCUIT BREAKER
UNDER TEST
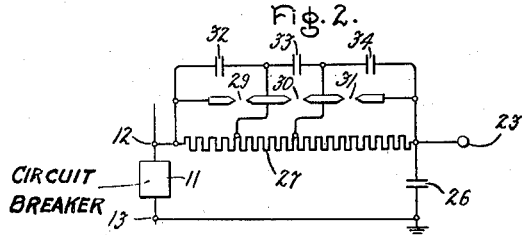
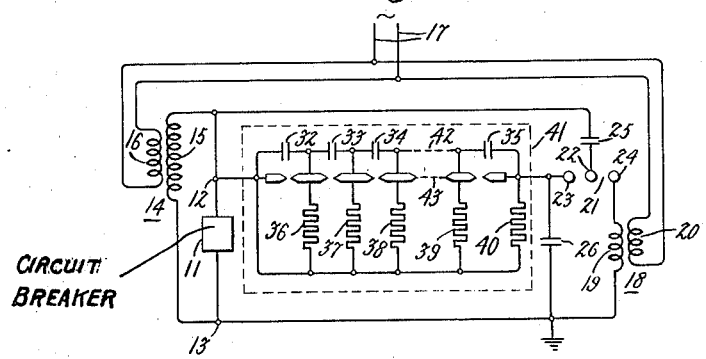
Inventor:
Wilfred F. Skeats,
by Harry E. Dunham
His Attorney.

Patented Feb. 4, 1941

2,230,730

UNITED STATES PATENT OFFICE 2,230,730

CIRCUIT BREAKER TESTING ARRANGEMENT

Wilfred F. Skeats, Lansdowne, Pa., assignor to General Electric Company, a corporation of New York Application January 11, 1939, Serial No. 250,347

7 Claims. (Cl. 175—183)

My invention relates to testing devices and concerns particularly methods and devices for testing the operation of circuit-interrupting devices at high apparent power on a low power source.

It is an object of my invention to provide improved simple operating apparatus for testing the operation of circuit breakers under conditions simulating the conditions of short circuit at rated apparent power as they occur in actual operation.

It is particularly an object of my present invention to provide a method and apparatus for testing the ability of circuit breakers to close in upon high voltage high current circuits with particular reference to those cases in which the current for which the circuit breaker is to be tested in this manner is higher than that which the testing plant is able to deliver at the rated voltage.

It is a further object of my invention to test under like conditions the behaviour of other apparatus which is intended to make and break electrical circuits or in which by accident an electrical circuit may be closed.

Other and further objects and advantages will become apparent as the description proceeds.

In carrying out my invention in its preferred form I provide a transformer for applying the desired test voltage to a circuit breaker to be tested and I provide a second lower-voltage relatively high-current-output transformer for delivering the desired testing current, thereby making it unnecessary to consume the power or use testing equipment having the rated apparent power which would be required if the full test voltage and full test current were supplied by a single transformer or by a directly connected generator. A three-electrode sphere gap is interposed between the high-current transformer and the tested breaker to prevent interference with the voltage of the high-voltage-transformer before the interelectrode space of the tested breaker has broken down and caused the three-electrode gap to break down. For the purpose of permitting control of the three-electrode gap a condenser is provided, across which the gap and the high-current transformer are connected in series, and a resistor is interposed in a circuit in series with the gap and the breaker to be tested. For tripping the gap when the tested breaker is closed a condensive connection is provided between the middle electrode of the gap and the high side of the breaker and for shunting the resistor after breakdown of the three-electrode gap a needle gap is provided across the resistor. Further refinements are described hereafter.

The invention will be understood more readily from the following detailed description when considered in connection with the accompanying drawing and those features of the invention which are believed to be novel and patentable will be pointed out in the claims appended hereto. In the drawing Fig. 1 is a circuit diagram representing schematically one embodiment of my invention. Fig. 2 is a fragmentary circuit diagram of a modification in the arrangement of Fig. 1 for use when a relatively high ratio is desired between the voltage of the high voltage source and the voltage of the high current source. Fig. 3 is a partial circuit diagram of another embodiment of my invention, particularly adapted for use with a high-current-supplying transformer which is provided with sufficient insulation between the parts of its windings, as well as sufficient insulation from ground, to withstand the voltage of the high-voltage transformer, and Fig. 4 is a circuit diagram of a further modification in the arrangement represented by Fig. 2. Like reference characters are utilized throughout the drawing to designate like parts.

In the drawing a circuit breaker or other piece of electrical equipment for making and breaking electrical circuits is represented at 11 and apparatus for testing the circuit breaker is shown with output terminals 12 and 13 to which the device 11 is adapted to be connected for being tested. In order to subject the tested device 11 to the voltage at which it is desired to test it, a transformer 14 is provided which may be a step-up transformer having a secondary winding 15 wound for the desired voltage and having a primary winding 16 connected to a suitable source of alternating current 17, preferably of the same frequency as the circuits in which the device 11 is ordinarily used. For supplying testing current of a desired magnitude to the device 11 without thereby subjecting the current source 17 to a kilowatt load or to a kilovolt ampere load which would correspond to a direct connection of the device 11 to the source 17, I provide a second transformer 18 having a secondary winding 19 wound to deliver the desired current, but wound for a lower voltage than the secondary winding 15 of the transformer 14. The transformer 18 is provided with primary winding 20 connected to the same source of alternating current 17 as the transformer 14.

The high current winding 19 is adapted to be connected across the terminals 12 and 13 to which the tested device 11 is connected, but in order to prevent dragging down the voltage supplied by the winding 15 which is, of necessity, a relatively low-current-capacity winding, a suitable device such as a spark gap 21 is interposed in the connection between the high current winding 19 and the terminals 12 and 13 of the tested device 11. In the arrangement shown the windings 15 and 19 each have a grounded low side, and the terminal 13 of the device 11 is also grounded. The gap 21 is interposed between the high side of the high current winding 19 and the high side of terminal 12 of the device 11. For enabling the gap 21 to be broken down and to close a circuit between the high side of the high current winding 19 and the terminal 12 of the device 11 a control electrode 22 is provided. The gap 21 is thus in the form of a three-electrode gap having end electrodes 23 and 24 and the said control or middle electrode 22.

For control of the potential of the middle electrode 22 a non-conductive connection is made between the middle electrode 22 and the terminal 12 of the device 11. Such a connection may be a condensive reactive connection in the form of a condenser 25 connected between the terminal 12 and the middle electrode 22. For the purpose of momentarily fixing the potential of the end electrode 23 of the gap 21 to permit the gap to be controlled by the potential of the middle electrode 22 a condenser 26 is connected between the grounded terminal 13 and the end electrode 23, and to prevent the potential of the electrode 23 from following too closely the potential of the terminal 12 a resistor 27 is connected between the terminal 12 and the electrode 23. The condenser 26 has one plate or electrode grounded and the other connected to the gap electrode 23. In order that the resistor 27 may be shunted out to permit the full available current of the high current winding 19 being applied to the device 11 at the proper time, a spark gap 28 is connected across the resistor 27.

The gap 21 is of the type which withstands relatively high steady state voltages or voltages of normal commercial frequencies but which may be broken down by transient voltages or sharp surges of the same order of magnitude, but the gap 28 on the contrary, is of the type which withstands relatively high sharp surge voltages, but readily breaks down upon the application of steady state voltages of the same order of magnitude. For this purpose the three-electrode gap 21 may be of the blunt electrode type, such as a sphere gap, for example, and the gap 28 may be of the sharp or pointed electrode type such as a needle gap, for example.

The operation of the circuit of Figure 1 is as follows: When the proper voltages are applied by the two transformers and the circuit breaker 11 is in its open position, the spark gaps 28 and 21 will remain open and the voltage of the relatively high potential winding 15 will be impressed across circuit breaker 11. When in the course of the closing of the circuit breaker 11 its contact separation becomes so low as to allow a spark to jump between the contacts which are, of course, connected to the circuit breaker terminals 12 and 13 the potential at the high side terminal 12 experiences a sudden drop and a similar drop is experienced by the sphere electrode 22 of the gap 21. Since the voltage of the end electrode 23 is maintained momentarily by the charge upon the condenser 26, the three-electrode gap 21 is thrown out of balance and breaks down. First a spark jumps between the electrodes 23 and 22 and this raises the potential of the electrode 22 to a point where the gap between electrodes 23 and 24 overstresses and breaks down. The entire gap space of the three-electrode gap 21 is thus broken down and the potential of the high current winding 19 is applied to the needle gap 28, which is so chosen as to be broken down by this potential when applied at normal frequency. The gaps 21 and 28 have thus broken down and a complete short circuit of the tested device 11 is produced across the high current winding 19 of the transformer 18. The high voltage winding 15 remains short circuited, but owing to the inherent reactance of the transformer 14, no undue load is drawn from the source 17.

It will be noted that between the times of the breakdown of the interelectrode space within the circuit breaker 11 and of the three-electrode gap 21, the needle gap 28 may be stressed up to the crest value of the voltage provided by the relatively high voltage transformer winding 15. It is for this reason that a needle gap is specified across the resistor 27 as this type of gap has the property of resisting a relatively high voltage when momentarily applied although it will break down when a relatively low voltage is continuously applied.

It will be understood, that the value of the resistance of the resistor 27 and the capacitance of the condenser 26 are so chosen that the end electrode 23 of the three-electrode sphere gap 21 assumes a potential sufficiently equal, under the application of normal frequency voltage, to that of the high voltage terminal 12 of the tested device 11. The voltage of the end electrode 24 is, of course, determined by the voltage of the winding 19 of the transformer and the potential of the middle electrode 22 will be determined by the relative magnitude of the capacitance of the condenser 25 and the inherent capacitances of the sphere electrode 22 to the other parts of the circuit. For the purpose of my circuit, the potential of the electrode 22 is adjusted by control of the magnitude of the capacitance of the condenser 25 so as to allow a minimum gap between the electrodes 23 and 22, and between the electrodes 23 and 24 without breakdown. The needle gap 28 is so adjusted as not to break down in response to a sharp surge voltage equal to the crest value applied by the high voltage transformer 14 but to be broken down by the application of the normal frequency voltage from the high-current winding 19.

In case it should be desirable to utilize a voltage ratio between the output voltages of the windings 15 and 19 which is beyond that at which the needle gap 28 can conveniently and reliably be made to operate as desired, the arrangement of Fig. 2 may be utilized in which the single needle gap 28 is replaced by a gap having a plurality of sections or consisting of a plurality of needle gaps 29, 30 and 31 connected in series. Intermediate points are connected to unequally spaced points of the resistor 27 in such a way that when the current in the resistor 27 controls the potential distribution, the gaps 29, 30 and 31 are very unequally stressed with the result that they will break down in sequence upon the application of a very low voltage. The capacitances across these gaps and from each terminal to ground, however, are so adjusted by means of the connection of properly proportioned condensers 32, 33 and 34, for example, that the arrangement has the ability to withstand the maximum voltage for the gap arrangement used when the potential distribution is controlled by the capacitances, that is, in the case of application of sharp surge voltage. Since voltage distribution is determined by capacitance in case of a momentary surge and by resistance in case of steadily applied voltage, it will be seen that the needle gap arrangement of Fig. 2 will be able to withstand a much higher voltage in the form of a momentary surge than when the voltage is continuously applied.

As shown in Fig. 3 the arrangement of Fig. 1 may be simplified if the relatively high-current transformer 18 is insulated to withstand the voltage of the transformer 14 both across windings of the transformer 18 and from the windings of the transformer 18 to ground. In the arrangement of Fig. 3 a three-electrode sphere gap 21 is placed on the ground side of the secondary winding 19 of the transformer 18 so that the inherent capacitance to ground of this winding takes the place of the condenser 26 of Fig. 1, the inherent inductance of the winding 19 serves the same purpose as the resistance of the resistor 27 of Fig. 1, and the resistor 27 may be eliminated so as to make the needle gap 28 unnecessary.

In order to avoid difficulties which may be encountered in the adjustment of the circuit of Fig. 2 when the ratio of voltage of the windings 15 and 19 is large, the modified circuit of Fig. 4 may be employed in which the single resistor 27 is replaced by a plurality of resistors, 36, 37, 38, 39 and 40, which may have progressively greater resistances as in the case of the sections of the resistor 27 of Fig. 2, but need not necessarily have progressively increasing resistances. It will be understood that the individual capacitances 32, 33, 34, etc. across the needle gap sections 29, 30, 31, etc. may not exceed certain values in order that total capacitance across the needle gap may be small compared with the capacitance of the condenser 26, which is necessary to enable the voltage across the condenser 26 to remain high long enough after the circuit breaker 11 closes. The smallest resistance across any needle gap section must be larger than a definite minimum in order that the time constant of that portion of the circuit consisting of the resistance and the capacitance across the gap section shall be large enough to maintain the condenser voltage during the peak of a sharp transient voltage wave, such as 1 x 5 microsecond wave, for example In Fig. 2 the ratio of the total series resistance of the resistor 27, to that of the smallest section is determined by the ratio of transformer voltages of windings 15 and 19. On the other hand, the total series resistance between the terminal 12 and the high side of the condenser 26 must be small enough so that during the time the voltage of the winding 15 is on before the circuit breaker 11 closes, the voltage drops in the resistance due to the charging current of the condenser 26 are not great enough to break down the gaps 32, 33 and 34. By employing the arrangement of Fig. 4, even in the case of high voltage and correspondingly high charging current, sufficiently low resistance may readily be interposed in the connection between the terminal 12 and the condenser 26 without preventing the provision of the proper time constant of the individual condenser resistor circuits in the portion of the apparatus enclosed within the dotted rectangle 41 in Fig. 4. It will be understood that any desired number of additional needle gap sections, condensers and resistors may be added as indicated by the broken lines 42 and 43, depending upon the ratio between the voltages of the transformer windings 15 and 19.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. Apparatus for testing circuit interrupting devices comprising first and second output terminals to which may be connected a device to be tested, means connected to said terminals for supplying a-c electric power at relatively high voltage, means connected on one side to the first of said terminals for supplying a-c electric power at relatively high current, a condenser having first and second electrodes the first of which is connected to said first terminal, a sphere gap comprising first and second end electrodes and a middle electrode, said first end electrode being connected to the remaining side of said high current source and said second end electrode being connected to the second electrode of said condenser, a resistor connected between said second terminal and said second condenser electrode, a second condenser connected between said middle sphere gap electrode and said second terminal, and a needle gap connected across said resistor, the dimensions of said gaps being so chosen that the normal frequency voltage is insufficient to break down the sphere gap and a sharp surge voltage equal to the crest value of the high voltage source is insufficient to break down the needle gap, but the surge voltage incident to circuit closure between said terminals is sufficient to break down said sphere gap and the normal frequency voltage of the high current source is sufficient to break down the needle gap.

2. Apparatus for testing circuit interrupting devices comprising, first and second output terminals to which may be connected a device to be tested, transformer means adapted to be energized by a common source and including a relatively high voltage output winding connected to said terminals, and a relatively high current output winding, said high current winding being connected on one side to the first of said output terminals, a condenser having first and second electrodes, the first of which is connected to said first terminal, a blunt electrode gap comprising first and second end electrodes and a middle electrode, said first end electrode being connected to the remaining side of said high current winding, and said second end electrode being connected to the second electrode of said condenser, a non-condensive impedance connected between said second output terminal and said second condenser electrode, a second condenser connected between said middle electrode and said second output terminal, and a sharp electrode gap connected across said non-condensive impedance, the dimensions of said gaps being so chosen that the normal frequency voltage of said windings is insufficient to break down the blunt electrode gap, and a sharp surge voltage equal to the crest value of the voltage of the high voltage winding is insufficient to break down the sharp electrode gap, but the surge voltage incident to circuit closure between said output terminals is sufficient to break down said blunt electrode gap, and the normal frequency voltage of the high current winding is sufficient to break down the sharp electrode gap.

3. Apparatus for testing circuit interrupting devices comprising first and second output terminals to which may be connected a device to be tested, means connected to said terminals for supplying electric power at relatively high voltage, means connected on one side to the first of said terminals for supplying electric power at relatively high current, a spark gap interposed between the other side of said high current source and the second of said output terminals, and means for breaking down said gap in response to drop in voltage between said output terminals comprising an electrode within the field of said spark gap and a capacitative connection between said electrode and one of said output terminals.

4. Apparatus for testing circuit interrupting devices comprising first and second output terminals to which may be connected a device to be tested, means connected to said terminals for supplying electric power at relatively high voltage, means connected on one side to the first of said terminals for supplying electric power at relatively high current, a condenser having first and second electrodes the first of which is connected to said first terminal, a blunt electrode gap comprising first and second end electrodes and a middle electrode, said first end electrode being connected to the remaining side of said high current source, and said second end electrode being connected to the second electrode of said condenser, a non-condensive impedance connected between said second terminal and said second condenser electrode, a second condenser connected between said middle electrode of the gap and said second terminal, a multi-section sharp electrode gap having a plurality of gaps and electrodes in series, conductive connections from intermediate points of said series of gaps to unequally distributed points on said impedance to cause the potential distribution in said sharp electrode gaps to be made unequal in response to current flowing through said impedance, and condensive connections between intermediate points of said sharp electrode gaps of such a value as to equalize the interelectrode capacitances of the gaps and thereby equalize the potential differences between the gaps in response to sharp surge voltages applied across the series of sharp electrode gaps.

5. Apparatus for testing circuit interrupting devices comprising first and second output terminals to which may be connected a device to be tested, means connected to said terminals for supplying electric power at relatively high voltage, means connected on one side to the first of said terminals for supplying electric power at relatively high current, said latter means being insulated to withstand the voltage of the first means, a three-electrode gap comprising first and second end electrodes and a middle electrode, said first end electrode being connected to the remaining side of said high current source and said second end electrode being connected to the second of said output terminals, and a condenser connected between said middle gap electrode and said first output terminal.

6. The method of testing the closing ability of a circuit interrupting device under current and voltage conditions exceeding the volt-ampere capacity of the test plant available which consists in producing in said plant current of rated voltage for the device to be tested, applying the voltage to the device, electrostatically storing energy at the said voltage for momentarily maintaining voltage after the contacts of the tested device have started to close, causing the contacts of the tested device to start closing, and upon drop in voltage across the tested device releasing the energy of the testing plant into said device at high current and relatively low voltage.

7. Apparatus for testing the closing ability of a circuit interrupting device under current and voltage conditions exceeding the volt-ampere capacity of the test plant available, which apparatus comprises means for producing in the test plant current of rated voltage for the device to be tested, means for applying the voltage to the device, means for electrostatically storing energy at the said voltage, a delay voltage breakdown element interposed between said electrostatic energy storage means and the contacts of the tested device, means for producing in the testing plant high current of relatively low voltage, and means responsive to drop in voltage across the tested device for releasing the energy of the testing plant into said device at said relatively high current and relatively low voltage through said delay voltage breakdown element.

WILFRED F. SKEATS.